United States Patent [19]
Kempka et al.

[11] Patent Number: 5,623,825
[45] Date of Patent: Apr. 29, 1997

[54] TURBO CHARGER ARRANGEMENT FOR AN INTERNAL COMBUSTION ENGINE

[75] Inventors: Karl-Heinz Kempka, Esslingen; Peter Strätz, Sindelfingen, both of Germany

[73] Assignee: MC Micro Compact Car Aktiengesellschaft, Biel, Switzerland

[21] Appl. No.: 708,891

[22] Filed: Sep. 5, 1996

[51] Int. Cl.⁶ ............................................. F02B 37/12
[52] U.S. Cl. ............................................ 60/602
[58] Field of Search .................... 60/600, 601, 602, 60/603

[56] References Cited

U.S. PATENT DOCUMENTS

| | | | |
|---|---|---|---|
| 4,203,296 | 5/1980 | Tanaka et al. | 60/602 |
| 4,372,119 | 2/1983 | Gillbrand et al. | 60/600 |
| 4,658,587 | 4/1987 | Ecomard | 60/602 |

FOREIGN PATENT DOCUMENTS

| | | | |
|---|---|---|---|
| 2823067 | 12/1978 | Germany . | |
| 4243448 | 6/1994 | Germany | 60/602 |
| 58-110820 | 7/1983 | Japan | 60/602 |
| 1-100317 | 4/1989 | Japan | 60/602 |

*Primary Examiner*—Michael Koczo
*Attorney, Agent, or Firm*—Klaus J. Bach

[57] ABSTRACT

In a turbocharger arrangement for an internal combustion engine including an exhaust gas turbine with an exhaust gas pressure control valve (waste gate) and an operating motor for opening or closing the waste gate, wherein a charger is coupled to the turbine and has a suction side and a discharge side in communication with the engine for supplying charge air thereto and wherein a system control valve is provided which is in communication with the suction side and with the pressure side of the charger and also with the waste gate operating motor for supplying suction air pressure or discharge air pressure to the waste gate operating motor, the system control valve includes means for placing the suction air side of the charger in communication with the charger air discharge side for returning charger discharge air to the suction side of the charger.

6 Claims, 2 Drawing Sheets

TURBO CHARGER ARRANGEMENT FOR AN INTERNAL COMBUSTION ENGINE

BACKGROUND OF THE INVENTION

The invention relates to a turbo charger arrangement for an internal combustion engine with a system control valve for operating a motor connected to a waste gate for controlling the engine exhaust gas pressure separately from an air return valve for returning compressed air through a short circuit line from the charger discharge side to the charger inlet side.

FIG. 1 shows schematically a turbocharger control arrangement of Bosch for a turbocharged engine wherein a system control valve for controlling the operating motor for an exhaust gas waste gate is arranged separately from an air return circuit. The system control valve includes a first control line extending from the air intake pipe at the suction side of the charger to the system control valve includes a first control line extending from the air intake pipe at the suction side of the charger to the system control valve. A second control line extends from the system control valve to the discharge side of the charger and a third control line extends from the system control valve to the operating motor for actuating the waste gate.

In a first control position of the system control valve, the operating motor of the waste gate is in direct communication with the suction side of the charger. In a second control position, the discharge side of the charger is in communication with the operating motor of the waste gate. When the engine is driven by the vehicle, the air return valve is opened whereby air discharged from the charger is returned to the charger inlet side. The air return valve is controllable by way of a separate control line.

Such an arrangement for controlling turbocharged engines under the various operating conditions has the disadvantage that it requires a large number of components and an extensive connecting line arrangement for the interconnection of the components.

It is the object of the present invention to provide a simple and relatively inexpensive turbocharger control arrangement for operating a turbocharged internal combustion engine under various operating conditions.

SUMMARY OF THE INVENTION

In a turbocharger arrangement for an internal combustion engine including an exhaust gas turbine with an exhaust gas pressure control valve (waste gate) and an operating motor for opening or closing the waste gate, wherein a charger is coupled to the turbine and has a suction side and a discharge side in communication with the engine for supplying charge air thereto and wherein a system control valve is provided which is in communication with the suction side and with the pressure side of the charger and also with the waste gate operating motor for supplying suction air pressure or discharge air pressure to the waste gate operating motor, the system control valve includes means for placing the suction air side of the charger in communication with the charger air discharge side for returning charger discharge air to the suction side of the charger.

Since in the arrangement according to the invention the system control valve assumes also the functions of an air return valve, no additional air return valve is needed and also the space normally occupied by the air return valve is available. The function of the return valve is incorporated into the system control valve. This permits the elimination of a substantial number of building components which makes the arrangement according to the invention less expensive. For example, by the elimination of the return air valve also the control line for controlling the return valve is eliminated whereby the turbocharger arrangement is simplified. Furthermore, examination and maintenance of the arrangement is facilitated. Also, the arrangement is less trouble prone and easier to service and repair since only one system control valve is used.

The invention will be described below in greater detail on the basis of the accompanying drawings.

DESCRIPTION OF THE PREFERRED EMBODIMENT

Figure 1:
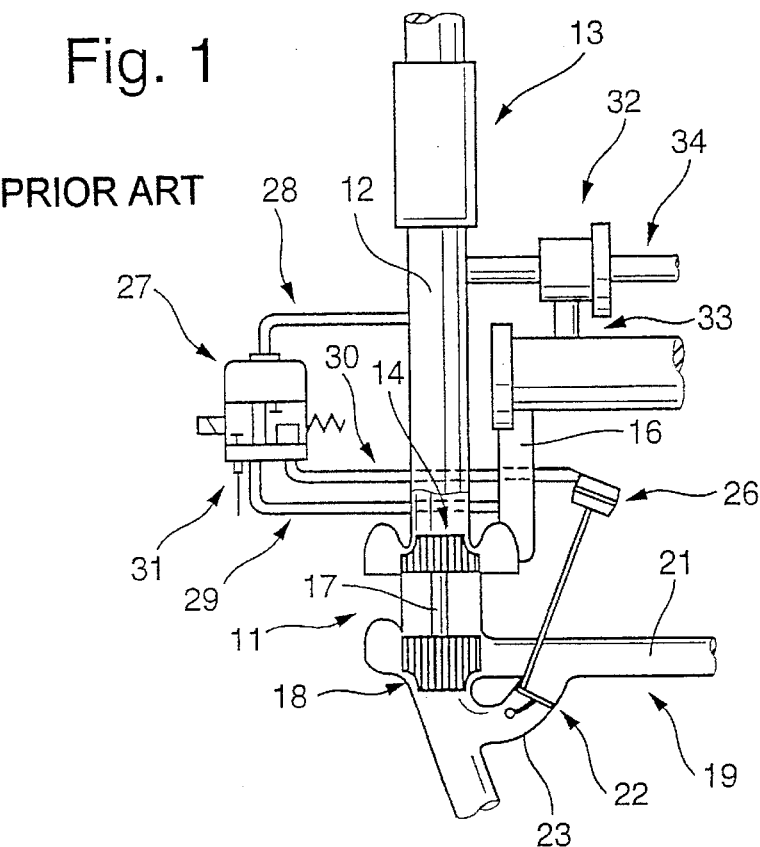
FIG. 1 is a schematic representation of a control arrangement for a turbocharged internal combustion engine in accordance with the state-of-the-art.

To facilitate understanding of the arrangement according to the invention, first a prior art arrangement is described with reference to FIG. 1, which is a schematic representation of part of a turbocharger control arrangement for a tubocharged internal combustion engine. The engine which is not shown in the figure, includes a charger 11, having a suction side with an air suction pipe 12 connected to an air mass flow meter 13. Downstream of an impeller 14, the charger 11 is connected to an engine intake duct 16 which leads to the internal combustion engine. The impeller 14 is directly connected by means of a drive shaft 17 to a turbine 18 which is disposed in the exhaust system 19 of the engine. Engine exhaust gas is supplied to the turbine 18 by way of an engine exhaust pipe 21 which is provided with a bypass line 23 for bypassing the turbine 18. The bypass line 23 includes an exhaust gas pressure control valve 22 (waste gate) for controlling the exhaust gas flow bypassing the turbine 18. The waste gate 22 is controllable by way of an operating motor 26 which is in communication with a system control valve 27.

The system control valve 27 includes a first control line 28 which communicates with the air suction pipe 12 up-stream of the charger 11. Furthermore, the system control valve includes, opposite the first control line 28, a second and third control line 29 and 30. The second control line 29 extends to the pressure side of the charger 11 where it is connected to the intake duct 16. The third control line 30 extends to the waste gate operating motor 26. The system control valve further is provided with an electrical connection 31 by way of which the system control valve 27 receives control signals from an engine electronic control unit.

The system control valve is a 3/2 way valve which has a first control position in which the first control line 28 is placed in communication with the third control line 30 so that the air suction pipe pressure is applied to the operating motor 26. In a second control position 42 of the system control valve, the second control line 29 is placed in communication with the third control line 30 so that the air pressure at the discharge side of the charger is applied to the operating motor 26.

From the air intake duct 16, an air return pipe 33 branches off and rejoins the suction pipe 12. The air return pipe 33 includes a return air flow control valve 32 which is controllable via a control line 34. When the return air flow valve 32 is opened a short circuit is established between the suction side and the discharge side of the charger 11.

Figure 2:
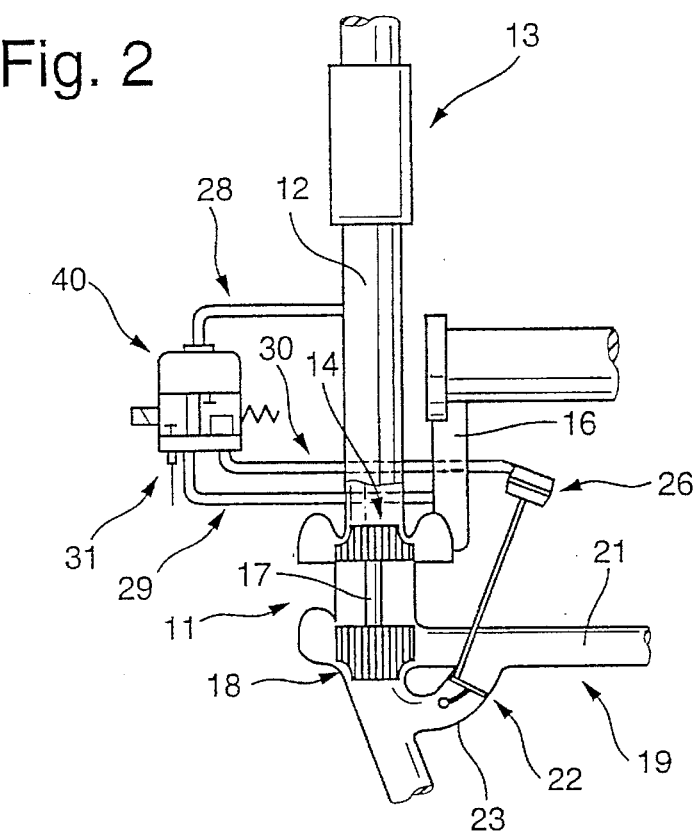
FIG. 2 is a schematic representation of a control arrangement for a turbocharged internal combustion engine according to the invention.
Figure 3:
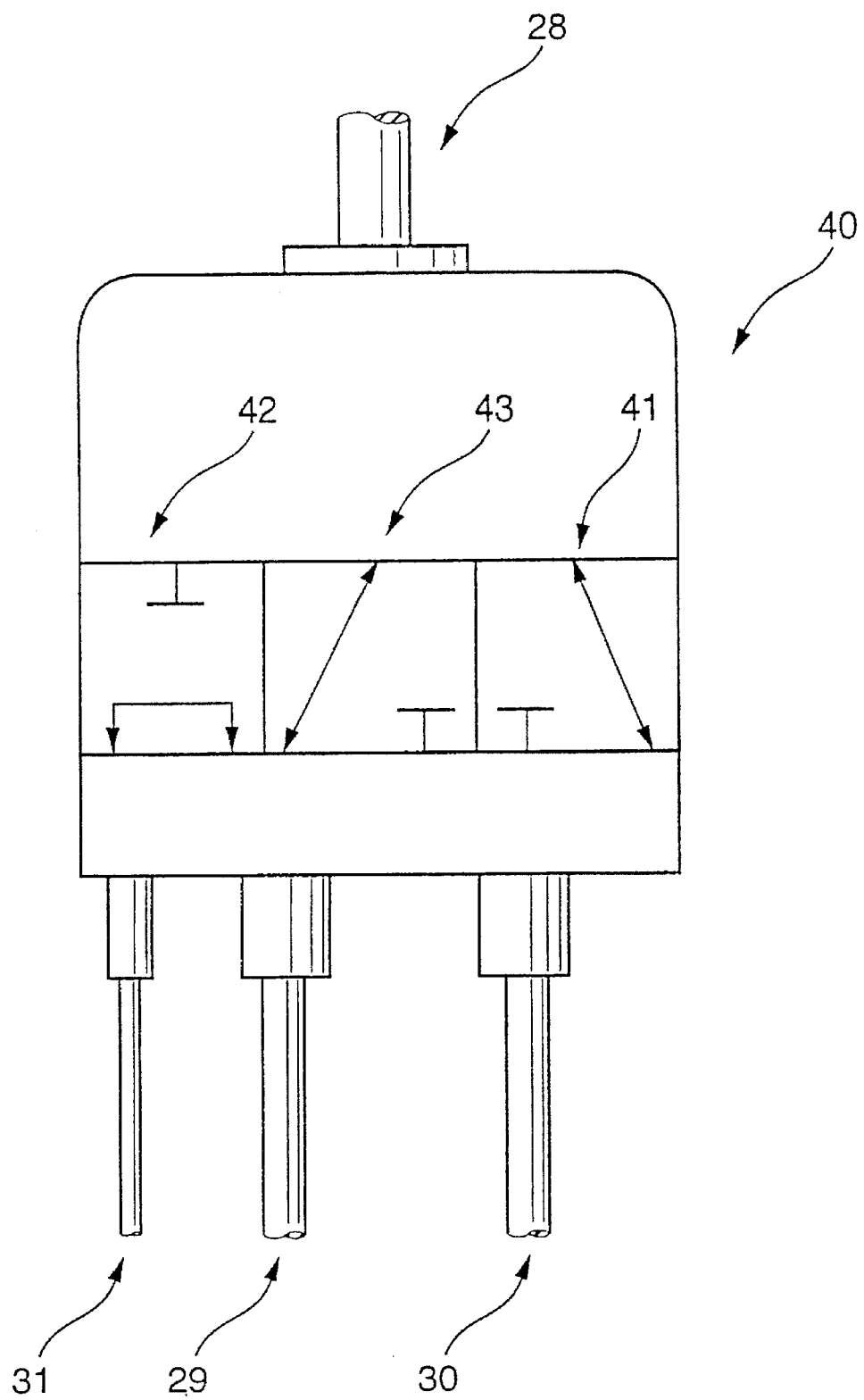
FIG. 3 is an enlarged schematic representation of the system control valve indicating various switching positions.

FIG. 2 is a schematic partial view of a turbocharger arrangement for an internal combustion engine which includes many of the same components which have been described in connection with FIG. 1 and which are indicated by the same reference numerals and not again described in detail. In the arrangement according to the invention as shown in FIG. 2, there is provided, in contrast to the arrangement of FIG. 1, a 3/3 way system control valve 40 which includes first and second control positions 41 and 42 corresponding to those of the system control valve 27 described in connection with FIG. 1. There is, however, a third control position 43 in which the first control line 28, which is connected to the air suction pipe 12, is placed in communication with the control line 29 which is connected to the discharge side of the charger 11. In this manner, a short circuit can be established between the pressure and the suction sides of the charger 11 through the system control valve 40. Consequently, the return air flow control valve 32 and the control line 34 therefor as shown in FIG. 1 are eliminated as air return flow can be established through the system control valve 40. This reduces the amount of components needed and provides for a simplified turbocharger control arrangement. The system control valve is still operated by signals from the engine control unit which oversees and manages engine operation.

What is claimed is:

1. A turbocharger arrangement for an internal combustion engine including an exhaust gas turbine with an exhaust gas pressure control valve (waste gate) and an operating motor connected to said waste gate for opening or closing said waste gate, a charger coupled to said exhaust gas turbine for rotation therewith and having an air suction side with an air suction pipe and an air discharge side connected to an engine air intake duct for supplying air from said charger to said engine, and a system control valve for controlling said waste gate operating motor, said system control valve being in communication with the suction side and with the pressure side of said charger for applying either suction or discharge air pressure to said waste gate operating motor and including means for placing said charger air suction side in communication with said charger air discharge side to permit discharge air to return to said charger air suction side through said system control valve.

2. A turbocharger arrangement according to claim 1, wherein a first control line extends between said system control valve and said air suction pipe, a second control line extends between said system control valve and said air intake duct downstream of said charger and a third control line extends between said system control valve and said waste gate operating motor for selectively subjecting said waste gate operating motor to either the pressure in said air suction pipe or in said air intake duct and said means for placing said air suction side in communication with said charger air discharge side includes said first and said second control lines.

3. A turbocharger arrangement according to claim 1, wherein said system control valve has a first control position, in which said waste gate operating motor is placed in communication with the suction side of said charger.

4. A turbocharger arrangement according to claim 1, wherein said system control valve has a second control position in which said waste gate operating motor is placed in communication with the pressure side of said charger.

5. A turbocharger arrangement according to claim 1, wherein said system control valve has a third control position in which said charger pressure side is placed in communication with the suction side of said charger through said system control valve.

6. A turbocharger arrangement according to claim 1, wherein said system control valve is a 3/3 way valve.

* * * * *